(12) United States Patent
Lin et al.

(10) Patent No.: US 8,296,934 B2
(45) Date of Patent: Oct. 30, 2012

(54) BONDING APPARATUS

(75) Inventors: Dong-Sheng Lin, Taipei Hsien (TW); Tzyy-Chyi Tsai, Taipei Hsien (TW); Jia-Jie Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 239 days.

(21) Appl. No.: 12/494,574

(22) Filed: Jun. 30, 2009

(65) Prior Publication Data

US 2010/0236058 A1    Sep. 23, 2010

(30) Foreign Application Priority Data

Mar. 19, 2009 (CN) .......................... 2009 1 0300960

(51) Int. Cl.
B23P 19/00 (2006.01)
(52) U.S. Cl. .......................................... 29/739; 29/759
(58) Field of Classification Search .................. 29/832, 29/738, 739, 759, 760; 156/538, 539, 556, 156/580, 581
See application file for complete search history.

(56) References Cited

U.S. PATENT DOCUMENTS

| | | | | |
|---|---|---|---|---|
| 5,936,850 A * | 8/1999 | Takahashi et al. | ............. | 361/784 |
| 5,979,739 A * | 11/1999 | Jin et al. | .......................... | 228/6.2 |
| 6,129,203 A * | 10/2000 | Kiyomura et al. | .......... | 198/832.1 |
| 6,171,049 B1 * | 1/2001 | Wirz et al. | ..................... | 414/680 |
| 6,191,838 B1 * | 2/2001 | Muramatsu | ................... | 349/149 |
| 6,449,836 B1 * | 9/2002 | Miyake et al. | ................... | 29/830 |
| 6,742,561 B2 * | 6/2004 | Nam et al. | ..................... | 156/521 |
| 6,910,265 B2 * | 6/2005 | Nieves | ............................. | 29/832 |
| 7,400,515 B2 * | 7/2008 | Sakamoto et al. | ............. | 361/803 |
| 7,411,569 B2 * | 8/2008 | Okazaki et al. | ................. | 345/56 |
| 7,656,673 B1 * | 2/2010 | Fries et al. | ..................... | 361/749 |
| 7,743,964 B2 * | 6/2010 | Maeda | ..................... | 228/180.22 |
| 7,797,820 B2 * | 9/2010 | Shida et al. | ..................... | 29/740 |
| 7,845,543 B1 * | 12/2010 | Yung et al. | ..................... | 228/103 |
| 7,886,956 B2 * | 2/2011 | Seyama et al. | ................ | 228/105 |
| 7,896,051 B2 * | 3/2011 | Kang et al. | ..................... | 156/539 |
| 7,955,904 B2 * | 6/2011 | Meadowcroft | ................ | 438/125 |
| 2003/0182796 A1 * | 10/2003 | Nieves | ............................. | 29/832 |
| 2005/0132565 A1 * | 6/2005 | Aoki et al. | ..................... | 29/743 |
| 2006/0016067 A1 * | 1/2006 | Yoshida et al. | ................ | 29/740 |
| 2006/0112545 A1 * | 6/2006 | Hwang | ........................... | 29/834 |
| 2006/0119118 A1 * | 6/2006 | Hata et al. | ..................... | 294/64.1 |
| 2006/0150404 A1 * | 7/2006 | Van De Ven | ..................... | 29/834 |
| 2006/0185157 A1 * | 8/2006 | Shida et al. | ..................... | 29/740 |
| 2006/0267218 A1 * | 11/2006 | Hozoji et al. | ................. | 257/782 |
| 2007/0157462 A1 * | 7/2007 | Nakamura | ..................... | 29/832 |
| 2008/0010818 A1 * | 1/2008 | Narita et al. | .................... | 29/830 |

(Continued)

*Primary Examiner* — David Angwin
(74) *Attorney, Agent, or Firm* — Altis Law Group, Inc.

(57) ABSTRACT

A bonding apparatus includes a frame, a first feeding mechanism, a second feeding mechanism, and a bonding mechanism. The first feeding mechanism is mounted on the frame and includes a turntable capable of rotating relative to the frame. A plurality of workpiece seats are arranged on the turntable. Each workpiece seat defines a plurality of first air holes. The second feeding mechanism is mounted on the frame and includes a first carrier and a second carrier. The first carrier includes a plurality of holding seats and the second carrier including a plurality of temporary holding seats. The first carrier is capable of rotating to stack on the second carrier. Each of the holding seats defines a plurality of second air holes. The bonding mechanism is movably mounted on the frame to correspond to the workpiece seats or the second carrier.

10 Claims, 7 Drawing Sheets

U.S. PATENT DOCUMENTS

| | | | |
|---|---|---|---|
| 2008/0127486 A1* | 6/2008 | Hirata et al. | 29/832 |
| 2008/0163481 A1* | 7/2008 | Shida et al. | 29/740 |
| 2009/0120589 A1* | 5/2009 | Kang et al. | 156/539 |
| 2009/0283220 A1* | 11/2009 | Chen | 156/566 |
| 2010/0011570 A1* | 1/2010 | Kimura | 29/743 |
| 2010/0089980 A1* | 4/2010 | Maeda | 228/199 |
| 2010/0140326 A1* | 6/2010 | Ebihara et al. | 228/111.5 |
| 2010/0301101 A1* | 12/2010 | Seyama et al. | 228/105 |
| 2012/0006494 A1* | 1/2012 | O'Farrell et al. | 156/365 |
| 2012/0118876 A1* | 5/2012 | Cho et al. | 219/635 |

\* cited by examiner

BONDING APPARATUS

BACKGROUND

1. Technical Field

The present invention relates generally to bonding apparatuses and methods and, more particularly, to a bonding apparatus and a bonding method for bonding at least two workpieces together.

2. Description of Related Art

In manufacturing electronic devices, some components, such as glass sheets and printed circuit boards, need be bonded together. For example, a touch panel includes a glass substrate, a conductive layer, and a protecting layer. The glass substrate, the conductive layer, and the protecting layer should be bonded together. Nowadays, more and more electronic devices, e.g., mobile phones, personal digital assistants, and liquid crystal display devices, utilize touch panels.

Before bonding components together, the components should be positioned, so that the edges of the components can be leveled in a same line. A typical bonding apparatus includes a belt with glue to feed to the components. If a component is put in an undesired position, the component must be repositioned on the sticky belt. However, some components deform and wrinkle easily. Thus, in the process of repositioning the components, the components may deform or wrinkle, resulting in unqualified products.

Therefore, a bonding apparatus and a bonding method which overcome the above-described shortcomings are desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
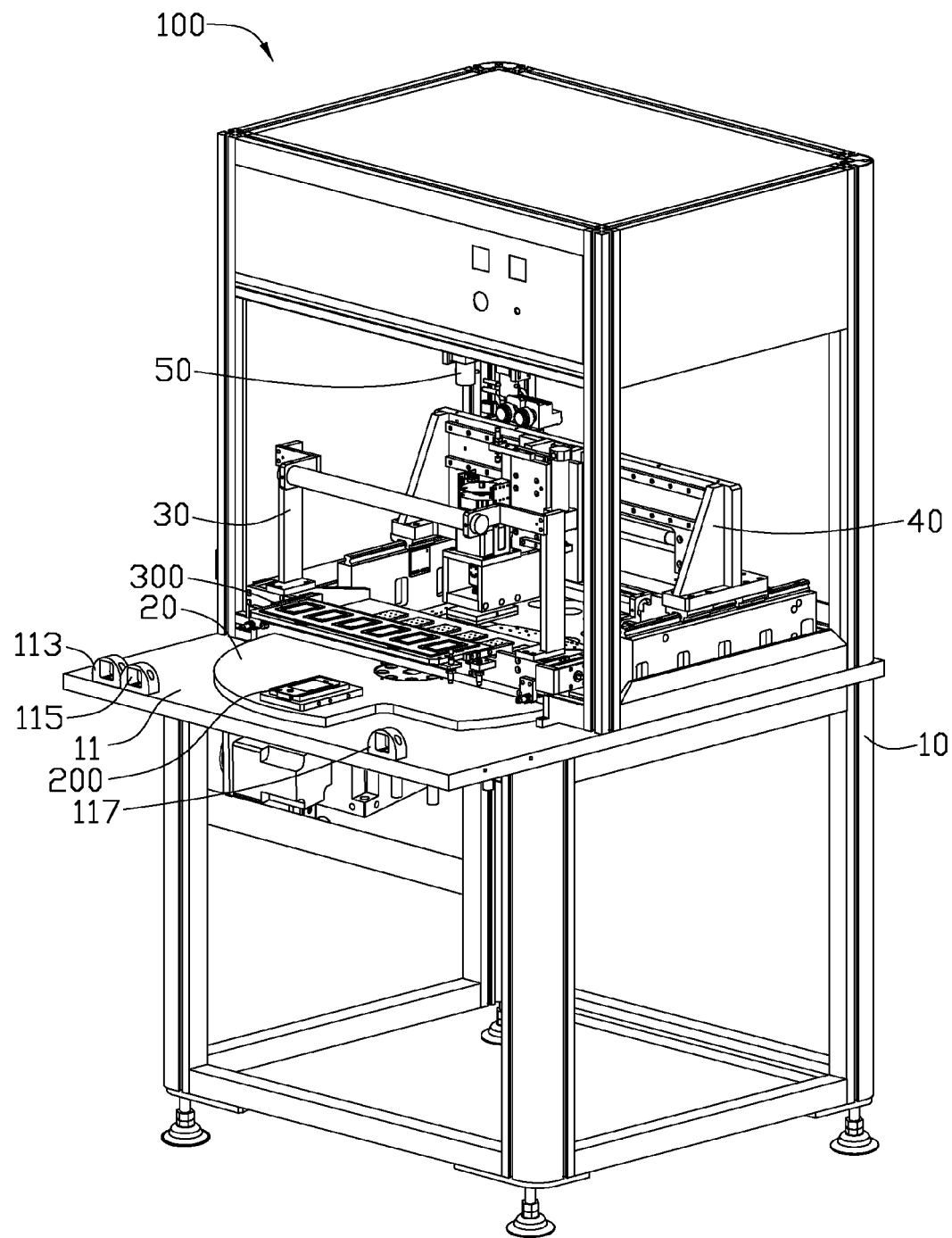
FIG. 1 is a perspective view of one embodiment of a bonding apparatus, the bonding apparatus including a frame, a first feeding mechanism, a second feeding mechanism, a bonding mechanism, and a camera module.

Referring to FIG. 1, an embodiment of a bonding apparatus 100 includes a frame 10, a first feeding mechanism 20, a second feeding mechanism 30, a bonding mechanism 40, and a camera module 50. A first workpiece 200 is fed by the first feeding mechanism 20, and a second workpiece 300 is fed by the second feeding mechanism 30. In the illustrated embodiment, the first workpiece 200 is made of glass, and the second workpiece 300 is made of foam sponge.

Figure 5:
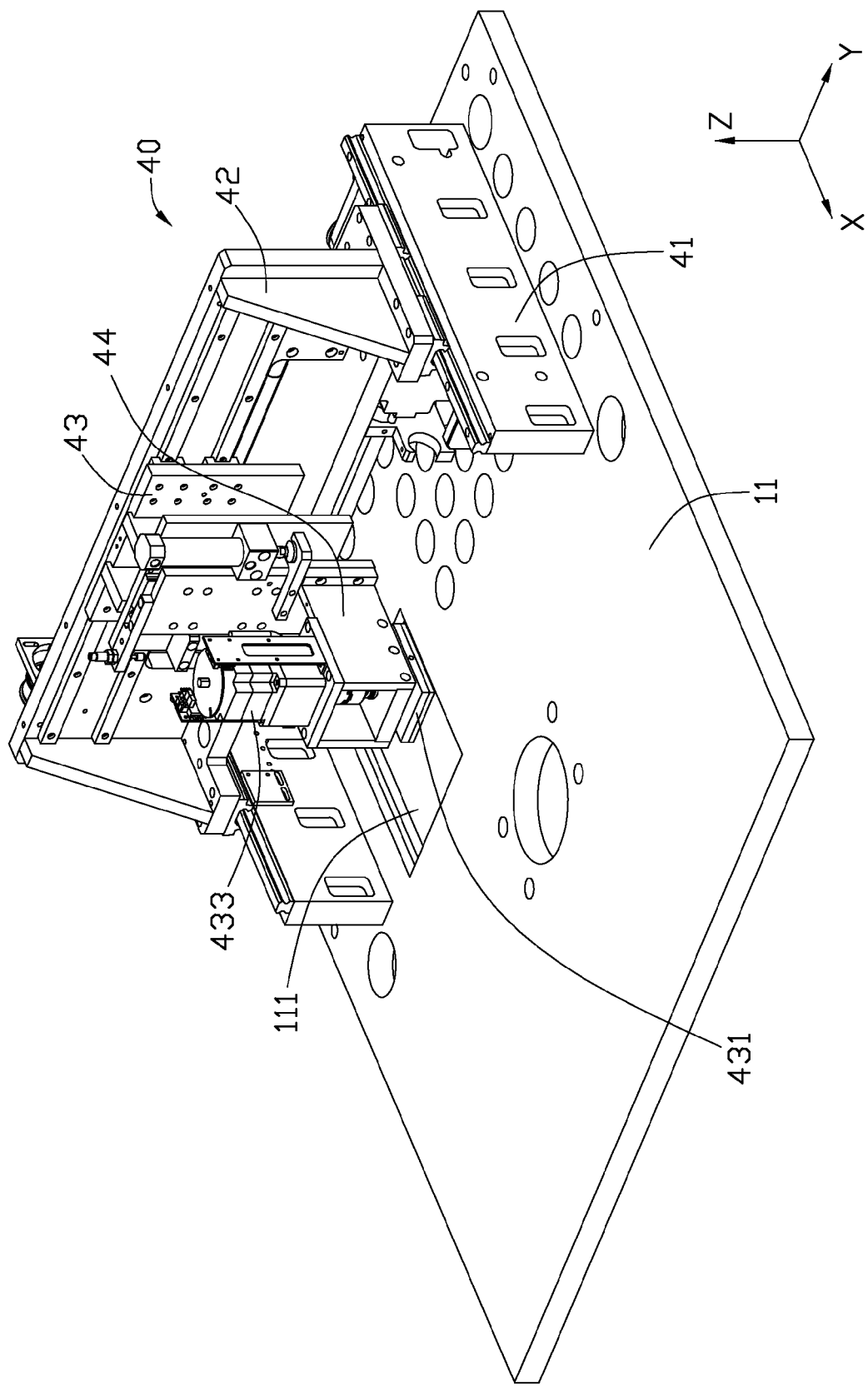
FIG. 5 is a perspective view of the bonding mechanism and part of the frame of FIG. 1.

The frame 10 includes a platform 11 defining an opening 111 (see FIG. 5). A first switch 113, a second switch 115, and a third switch 117 are mounted on the platform 11.

Figure 2:
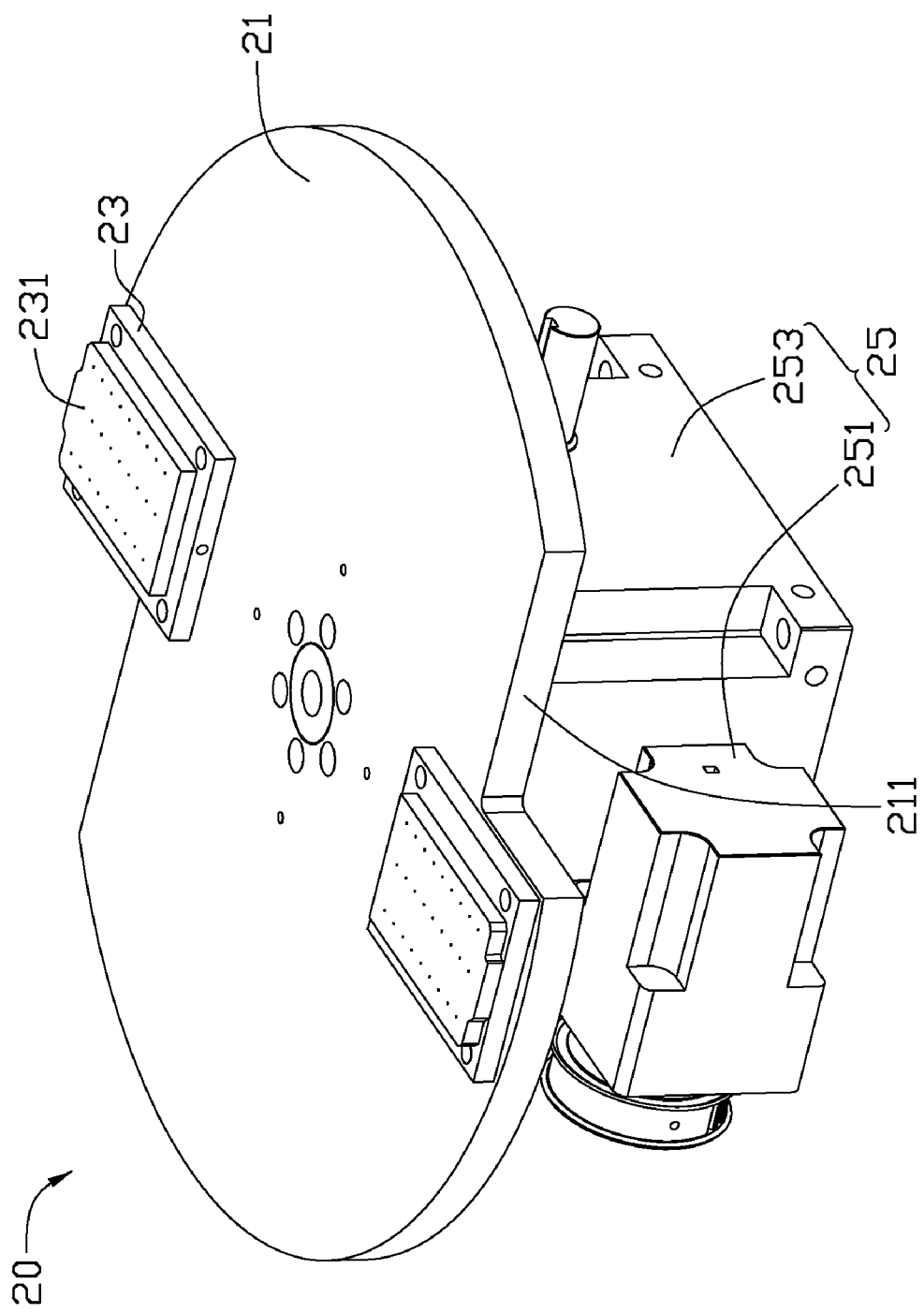
FIG. 2 is a perspective view of the first feeding mechanism of FIG. 1.

Referring to FIG. 1 and FIG. 2, the first feeding mechanism 20 includes a turntable 21, a plurality of workspace seats 23 mounted on the turntable 21, and a drive mechanism 25 to drive the turntable 21 to rotate. The turntable 21 defines two cutouts 211 at opposite sides of a periphery. The cutouts 211 are configured for preventing the turntable 21 from obstructing the camera module 50. Each workpiece seat 23 defines a plurality of air holes 231. The drive mechanism 25 includes an electric motor 251 and a divider 253 to drive the turntable 21. Alternatively, the turntable 21 may be driven by a pneumatic cylinder. In the illustrated embodiment, two opposite workpiece seats 23 are arranged at the turntable 21. The first workpiece 200 may be held on the workpiece seats 23 by a vacuum suction method.

Figure 3:
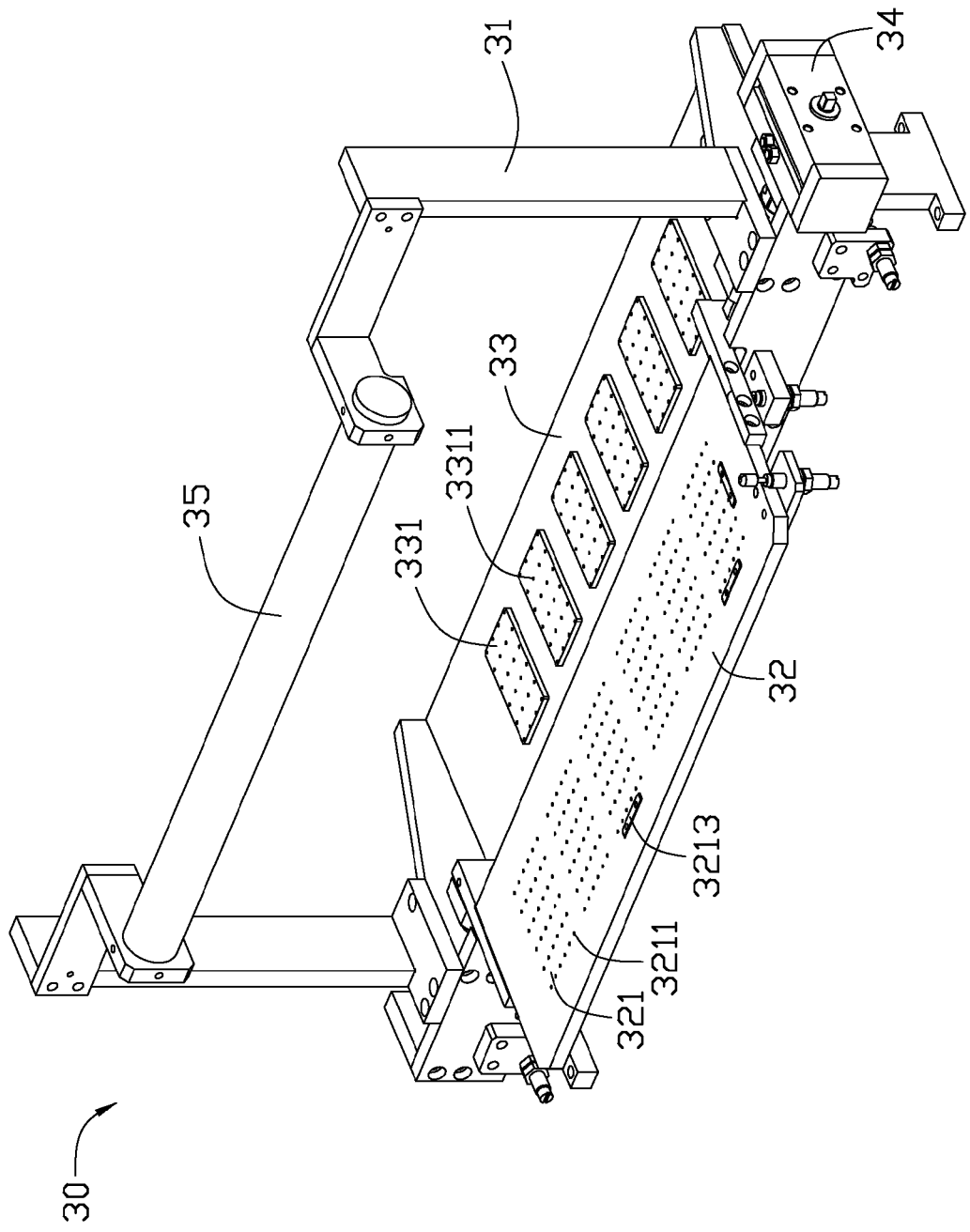
FIG. 3 is a perspective view of the second feeding mechanism of FIG. 1.

Referring to FIGS. 1 and 3, the second feeding mechanism 30 includes a bracket 31 mounted on the platform 11, a first carrier 32, a second carrier 33, a pneumatic cylinder 34, and an ionic-wind bar 35. The bracket 31 includes a base body (not labeled) and two arms (not labeled) extending from opposite ends of the base body. The ionic-wind bar 35 is positioned between top ends of the arms. The first carrier 32 is pivotally connected to the base body of the bracket 31 and the second carrier 33 is fixed on the base body. The first carrier 32 can be rotated to fold onto the second carrier 33. The pneumatic cylinder 34 is positioned at a side of the bracket 31 to drive the first carrier 32 to rotate. The first carrier 32 includes a plurality of holding seats 321, each defining a plurality of air holes 3211. The second carrier 33 includes a plurality of temporary holding seats 331, each defining a plurality of air holes 3311.

Figure 4:
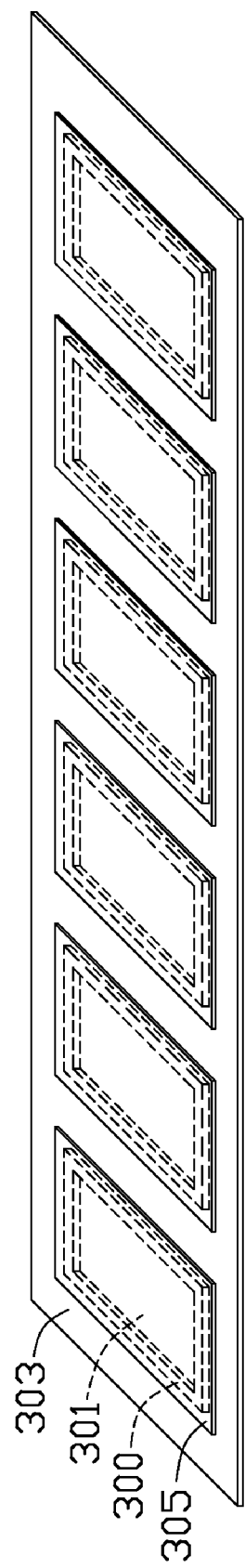
FIG. 4 is a perspective view of a second workpiece located on the second feeding mechanism of FIG. 1.

Referring to FIG. 4, the second workpiece 300 is substantially rectangular and defines a rectangular slot 301. A strip of first protecting film 303 is attached with a plurality of second workpieces 300. Alternatively, the first protecting film 303 may be attached with six, or less than or more than six second workpieces 300 as in the illustrated embodiment. A top surface of each second workpiece 300 is coated with a second protecting film 305. The bottom surface of each second workpiece 300 attached to the first protecting film 303 is applied with adhesive, and the first protecting film 303 has a releasing coating coated thereon to facilitate separating the first protecting film 303 from the second workpieces 300. The first carrier 32 forms at least one positioning block 3213. In the illustrated embodiment, the first carrier 32 includes six holding locations 321 aligned in a line, and the second carrier 33 includes six temporary holding locations 331 aligned in a line corresponding to the holding locations 321. The temporary holding seats 331 are protrusions that can extend in the slots 301 of the second workpieces 300. The temporary holding seat 331 has a thickness larger than the second workpiece 300 so that the adhesive does not contact the second carrier 33. The ionic-wind bar 35 can remove static electricity of the first carrier 32 and the second carrier 33. Alternatively, the ionic-wind bar 35 may be other static electricity removing structures such as an ionic-wind gun and a static electricity bar.

Referring to FIG. 1 and FIG. 5, the bonding mechanism 40 is mounted on the platform 11 of the frame 10. The bonding mechanism 40 includes two sidewalls 41 extending along a first direction, a cross beam 42 slidably mounted on the sidewalls 41 and extending along a second direction perpendicular to the first direction, a slidable holder 43 slidably mounted on the cross beam 42, and a slidable platform 44 slidably mounted on the slidable holder 43. The sidewalls 41 include a first guide rail along the first direction, i.e., the X-axis, the cross beam 42 includes a second guide rail along the second direction, i.e., the Y-axis, and the slidable holder 43 includes a third guide rail along a third direction, i.e., the Z-axis. The slidable platform 44 includes a pickup head 431 and a pneumatic cylinder 433 connected to the pickup head 431. The pneumatic cylinder 433 can control the pickup head 431 to slide along the Z-axis.

Figure 6:
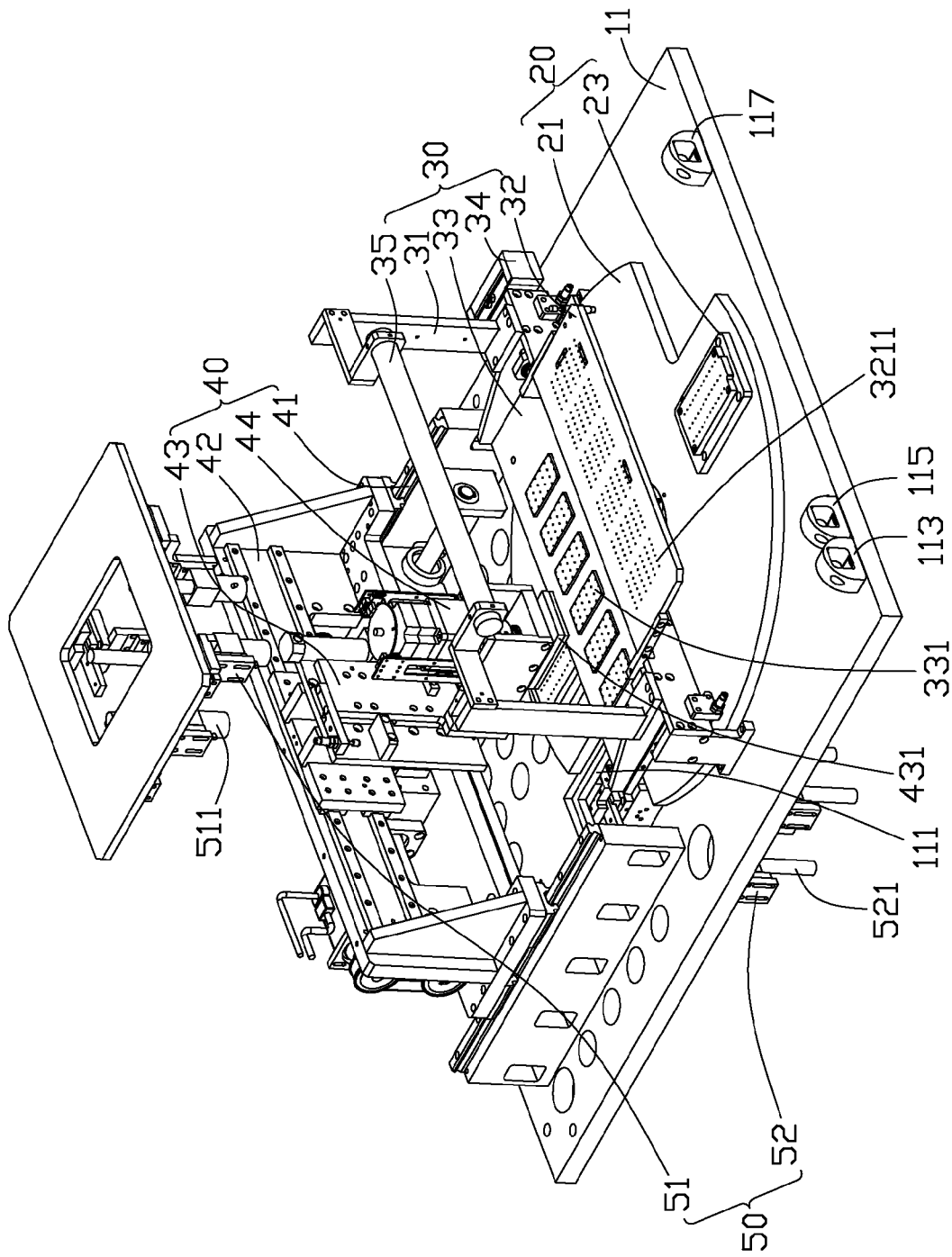
FIG. 6 is a perspective view of part of the bonding mechanism of FIG. 1.

Referring to FIG. 1 and FIG. 6, the camera module 50 includes a first module 51 and a second module 52. In the illustrated embodiment, the camera module 50 is a charge coupled device (CCD) module. The first module 51 and the second module 52 are fixed on the frame 10. The first module 51 is mounted on a top portion of the frame 10 and corresponds to the first feeding mechanism 20 and the second feeding mechanism 30. The second module 52 is mounted on the bottom side of the platform 11 of the frame 10 and corresponds to the opening 111. In the illustrated embodiment, the first module 51 includes four lenses 511 with image sensors and the second module 52 includes four lenses 521 with image sensors. A standard coordinate value between the first module 51 and the second module 52 is predetermined and stored in a controller of the bonding apparatus 100.

Figure 7:
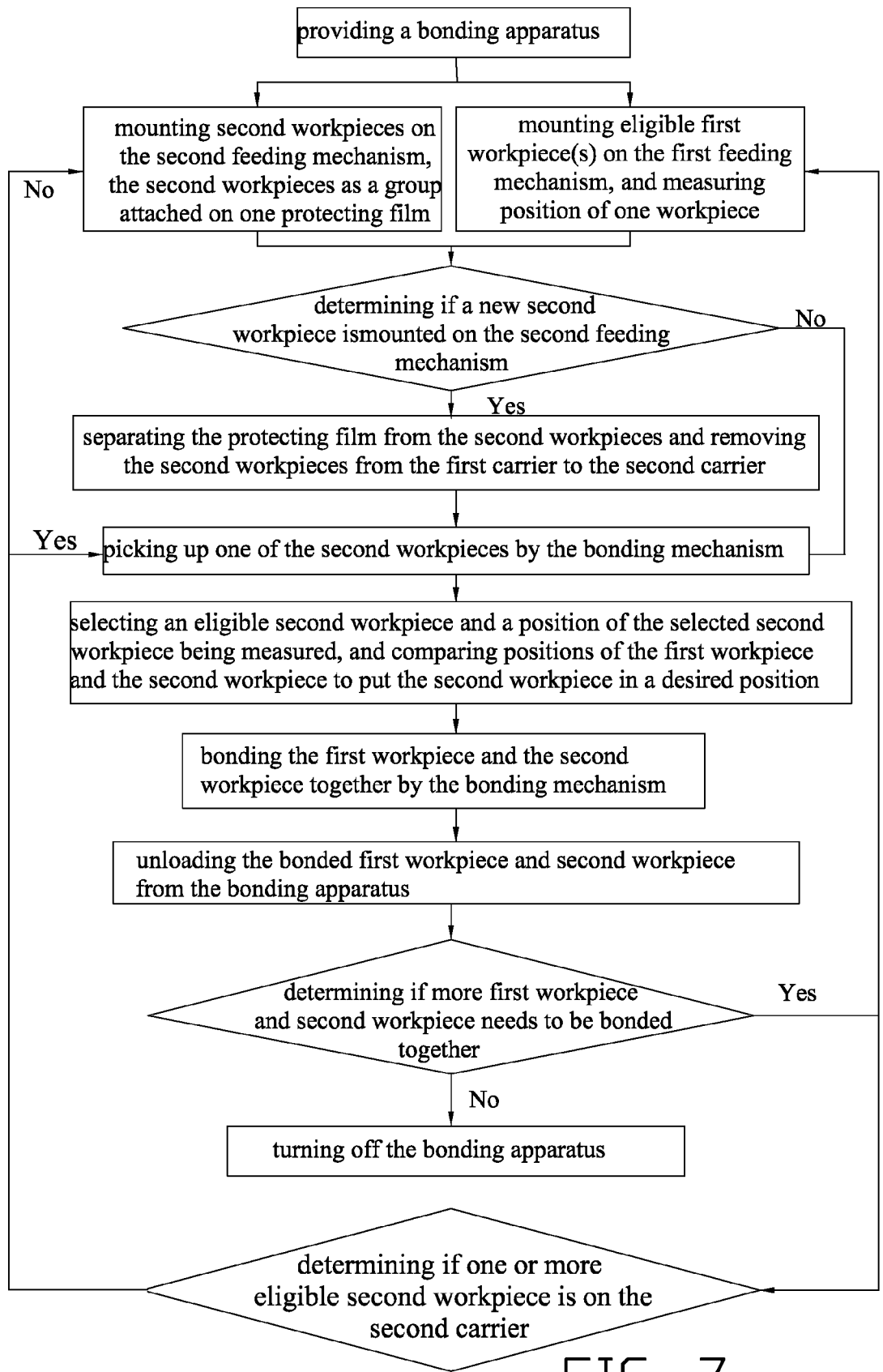
FIG. 7 is a flow chart of an embodiment of a bonding method.

Referring to FIG. 4 and FIG. 7, a method of bonding the first workpiece 200 and the second workpiece 300 together via the bonding apparatus 100 is described as follows.

The first workpiece(s) 200 is mounted on the first feeding mechanism 20 and a position of one of the workpiece(s) 200 is measured. That is, one first workpiece 200 is mounted on one of the workpiece seats 23 of the first feeding mechanism 20. The first workpiece 200 is an eligible workpiece which has been measured beforehand. The first switch 113 is turned on and the first workpiece 200 is held on the workpiece seat 23 by a suction force from the air holes 231. The second switch 115 is turned on to rotate the turntable 21, so that the workpiece seat 23 holding the one first workpiece 200 is carried to a position corresponding to the bonding mechanism 40. The first module 51 captures a first image of the first workpiece 200 to determine a positioning value of the first workpiece 200. Another first workpiece 200 may be put on another workpiece seat 23 of the first feeding mechanism 20.

The second workpiece(s) 300 is placed on the second feeding mechanism 30. That is, a group of second workpieces 300 are mounted on the first carrier 32 of the second feeding mechanism 30 with the second protecting film 305 facing the first carrier 32. The second workpieces 300 can be positioned on the first carrier 32 using the positioning block 3213 as reference. The first protecting film 303 is removed from the second workpieces 300.

The second workpiece(s) 300 is moved from the first carrier 32 to the second carrier 33 of the second feeding mechanism 30. That is, the third switch 117 is turned on and the second workpieces 300 are held on the first carrier 32 by a suction force from the air holes 3211. The pneumatic cylinder 34 is turned on to drive the first carrier 32 to rotate to an angle of 180 degrees. The first carrier 32 is thus folded over/on the second carrier 33, and the temporary holding seats 331 extend into the cutouts 301 of the second workpieces 300 correspondingly. The third switch 117 is turned off so that the second workpieces 300 are freed from the first carrier 32 and mounted on the second carrier 33. The pneumatic cylinder 34 is turned on to drive the first carrier 32 to rotate through an angle of 180 degrees, thus returning to the original position.

The bonding mechanism 40 picks up one second workpiece 300. The pickup head 431 moves to a position above the second carrier 33 of the second feeding mechanism 30. The pickup head 431 picks up the second workpiece 300 from the second carrier 33.

The camera module 50 captures a second image of the second workpiece 300 to assist selecting an eligible second workpiece 300 and positioning the second workpiece 300 in a desired position. The second module 52 of the camera module 50 takes pictures of the second workpiece 300 and transmit the pictures to the controller. The controller compares the size and shape of the second workpiece 300 with the desired size and shape stored in the controller beforehand. If the measured size and shape are inconsistent to the desired size and shape, the pickup head 431 returns the second workpiece 300 on the second carrier 33, and picks up another second workpiece 300. If the picked second workpiece 300 has size and shape consistent to the desired size and shape, i.e., the second workpiece 300 is eligible, the controller compares a measured coordinate value between the second workpiece 300 and the first workpiece 200 corresponding to the second workpiece 300 with the standard coordinate value between the second workpiece 300 and the first workpiece 200. If the measured coordinate value is inconsistent to the standard coordinate value, the controller controls the pickup head 431 to slide along the X-axis or the Y-axis, or rotate around the Z-axis, until the second workpiece 300 is in a desired position. While moving, the lenses 521 is taking pictures all along and the controller compares the measured coordinate with the standard coordinate value all along.

The first workpiece 200 and the second workpiece 300 are bonded together by the bonding mechanism 40. The pickup head 431 moves along the Z-axis towards the first workpiece 200. The second workpiece 300 is bonded to the first workpiece 200. The pickup head 431 releases the second workpiece 300 and moves away from the second workpiece 300.

The bonded first workpiece 200 and second workpiece 300 is unloaded from the bonding apparatus 100. The turntable 21 is rotated to eject the bonded first workpiece 200 and second workpiece 300 from the bonding mechanism 40. By rotating the turntable 21, another first workpiece 200 is in the position corresponding to the boning mechanism 40. If more first workpiece 200 and second workpiece 300 need to be bonded, another first workpiece 200 is put on one of the workpiece seats 23.

If more first workpiece 200 and second workpiece 300 need to be bonded together, the above-described steps are repeated from the step of the bonding mechanism 40 picking up another workpiece 300. Furthermore, if no eligible second workpiece 300 is on the second carrier 33, the ineligible second workpiece 300 is removed from the second carrier 33 and the step of mounting the second workpiece(s) 300 on the second feeding mechanism 30 and removing the second workpiece(s) 300 from the first carrier 32 to the second carrier 33 is repeatedly performed before picking one second workpiece 300.

Alternatively, certain of the steps described above may be removed, others may be added, and the sequence of steps may be altered. For example, the position of the first workpiece 200 may be measured at any time before bonding to the second workpiece 300. Similarly, the position of the second workpiece 300 may be measured at any time before bonding to the first workpiece 200. The sequence of mounting the first workpiece 200 on the first feeding mechanism 20 and mounting the second workpiece 300 on the second feeding mechanism 30 may be altered or the steps may be performed simultaneously. The sequence of moving the second workpiece 300 from the first carrier 32 to the second carrier 33 mounting the first workpiece 200 on the first feeding mechanism 20 may also be altered.

An adjustable range by moving the pickup head 431 is relatively small. Therefore, if the positions of the first workpiece 200 on the workpiece seat 23 and the second workpiece 300 on the first carrier 32 are too far away from desired positions, the first workpiece 200 and the second workpiece 300 should be rearranged. The first workpiece 200 and the second workpiece 300 will not deform or wrinkle during rearrangement, because they are held in position by suction force. In addition, the first protecting film 303 is to be manually removed rather than automatically because a machine providing a constant force is likely to deform or wrinkle the second workpiece 300. A plurality of second workpieces 300 mounted on one first protecting film 303 results in a high efficiency during removal of the first protecting film 303.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A bonding apparatus, comprising:
a frame;
a first feeding mechanism mounted on the frame and comprising a turntable capable of rotating relative to the frame, and a plurality of workpiece seats arranged on the turntable, each workpiece seat defining a plurality of first air holes;
a second feeding mechanism mounted on the frame and comprising a first carrier and a second carrier, the first carrier comprising a plurality of holding seats and the second carrier comprising a plurality of temporary holding seats, wherein the first carrier is capable of rotating to stack on the second carrier, and each of the holding seats defines a plurality of second air holes; and
a bonding mechanism movably mounted on the frame, and the bonding mechanism is movable between the workpiece seats and the second carrier.

2. The bonding apparatus of claim 1 further comprising a camera module having a first module and a second module; the first module faces one of the workpiece seats and the second module faces one of the temporary holding seats of the second carrier.

3. The bonding apparatus of claim 2, wherein the first module comprises a plurality of lenses and the second module comprises a plurality of lenses.

4. The bonding apparatus of claim 2, wherein the frame comprises a platform at a middle portion of the frame; the turntable and the bonding mechanism are disposed at a first side of the platform; the first module is disposed at the first side of the platform, and the second module is disposed at a second side of the platform opposite to the first side.

5. The bonding apparatus of claim 4, wherein the platform defines an opening corresponding to the second module of the camera module; the turntable defines a plurality of cutouts can be rotated to correspond to the second module of the camera module.

6. The bonding apparatus of claim 1, wherein the second feeding mechanism further comprises a static electricity removing structure.

7. The bonding apparatus of claim 1, wherein the temporary holding seats are protrusions.

8. The bonding apparatus of claim 1, wherein the bonding mechanism comprises a slidable platform capable of moving along a first direction, a second direction, and a third direction perpendicular to each other, and rotating around the third direction.

9. The bonding apparatus of claim 8, wherein the slidable platform comprises a pickup head to pick up workpieces.

10. The bonding apparatus of claim 8, wherein the bonding mechanism further comprises two sidewalls extending along the first direction, a cross beam slidably mounted on the sidewalls and extending along the second direction, and a slidable holder slidably mounted on the cross beam; the slidable platform is slidably mounted on the slidable holder; each sidewall comprises a first guide rail along the first direction, the cross beam comprises a second guide rail along the second direction, and the slidable holder comprises a third guide rail along a third direction.

* * * * *